(12) United States Patent
Fedewa et al.

(10) Patent No.: US 12,496,125 B2
(45) Date of Patent: Dec. 16, 2025

(54) ASSESSMENT OF ATRIAL MYOCARDIAL VIABILITY USING SPECTRAL ANALYSIS OF ULTRASOUND

(71) Applicant: The Cleveland Clinic Foundation, Cleveland, OH (US)

(72) Inventors: Russell Fedewa, Shaker Heights, OH (US); Oussama Wazni, Bentleyville, OH (US); Scott Anjewierden, Rochester, MN (US)

(73) Assignee: THE CLEVELAND CLINIC FOUNDATION, Cleveland, OH (US)

( * ) Notice: Subject to any disclaimer, the term of this patent is extended or adjusted under 35 U.S.C. 154(b) by 990 days.

(21) Appl. No.: 17/541,438

(22) Filed: Dec. 3, 2021

(65) Prior Publication Data

US 2022/0175447 A1 Jun. 9, 2022

Related U.S. Application Data

(60) Provisional application No. 63/121,664, filed on Dec. 4, 2020.

(51) Int. Cl.
*A61B 18/14* (2006.01)
*A61B 18/00* (2006.01)

(52) U.S. Cl.
CPC ............. *A61B 18/1492* (2013.01); *A61B 2018/00351* (2013.01); *A61B 2018/00577* (2013.01); *A61B 2018/00994* (2013.01)

(58) Field of Classification Search
CPC ............ A61B 18/1206; A61B 18/1492; A61B 2018/00351; A61B 2018/00577; A61B 2018/00642; A61B 2018/00702; A61B 2018/00875; A61B 2018/00994;
(Continued)

(56) References Cited

U.S. PATENT DOCUMENTS

| | | | |
|---|---|---|---|
| 5,776,063 A | 7/1998 | Dittrich et al. | |
| 5,951,476 A | 9/1999 | Beach | |
| 9,445,781 B2 | 9/2016 | Hill | |

(Continued)

FOREIGN PATENT DOCUMENTS

CN 1135956 C 6/2000

OTHER PUBLICATIONS

Liu, et al. "A feasibility study of novel ultrasonic tissue characterization for prostate-cancer diagnosis: 2D spectrum analysis of in vivo data with histology as gold standard." Medical Physics. vol. 36, No. 8. Aug. 2009. pp. 3504-3511.

(Continued)

*Primary Examiner* — Tigist S Demie
(74) *Attorney, Agent, or Firm* — McDonald Hopkins LLC

(57) ABSTRACT

Spectral parameters of ultrasound backscatter of myocardial tissue can be utilized to identify fibrosis and accurately assess myocardial viability during ablation procedures to treat atrial fibrillation. For example, a portion of myocardial tissue may be ultrasonically insonified, the backscatter signal of ultrasonic waves backscattered from the portion of myocardial tissue may be measured, a spectral parameter of the backscatter signal may be determined, the spectral parameter may be correlated with an electrical conductivity of the portion of myocardial tissue; and a treatment of the patient may be determined or adjusted based on the correlation.

20 Claims, 10 Drawing Sheets

(58) Field of Classification Search
CPC ............ A61B 2090/3784; A61B 8/085; A61B 8/0883; A61B 8/12; A61B 8/5207; A61B 8/5223

See application file for complete search history.

(56) References Cited

U.S. PATENT DOCUMENTS

| | | | |
|---|---|---|---|
| 2004/0002654 | A1 | 1/2004 | Davidson et al. |
| 2005/0033174 | A1 | 2/2005 | Moehring et al. |
| 2006/0167529 | A1 | 7/2006 | Schecter |
| 2008/0275340 | A1 | 11/2008 | Beach et al. |
| 2009/0270734 | A1 | 10/2009 | Ragauskas et al. |
| 2009/0299186 | A1 | 12/2009 | Waters et al. |
| 2014/0094691 | A1* | 4/2014 | Steinberg ............... A61B 5/064 600/424 |
| 2015/0359448 | A1 | 12/2015 | Beach |
| 2016/0354061 | A1 | 12/2016 | Hecker et al. |
| 2017/0215952 | A1* | 8/2017 | Nair ................... A61B 18/1492 |

OTHER PUBLICATIONS

Ghoshal, et al. "Temperature dependent ultrasonic characterization of biological media." Journal Acoust. Soc. Am., vol. 130, No. 4. Oct. 2011. pp. 2203-2211.

Davison, et al. "938-59 Ultrasound Biopsy: A novel technique for nondestructive Intracardiac Tissue Characterization." Journal of American College of Cardiology. 2_Supplement_1 162A. Jan. 25, 2002. 1 page.

Sayseng, et al. "Catheter ablation lesion visualization with intracardiac strain imaging in canines and humans." IEEE Trans Ultrason Ferroelectr Freq Control. vol. 678, No. 9. Sep. 2020. pp. 1800-1810.

Xie, et al. "Quantitative evaluation of myocardial fibrosis by cardiac integrated backscatter analysis in Kawasaki disease." Cardiovascular Ultrasound. vol. 14, No. 3. 2016. 7 pages.

Wang, et al. "Relationship Between Integrated Backscatter and Atrial Fibrosis in Patients with and Without Atrial Fibrillation Who Are Undergoing Coronary Bypass Surgery." Clinical Pathologic Correlations. vol. 32, No. 9. 2009. pp. E56-E61.

Foresight Ice System. Accessed Dec. 28, 2021 http://conavi.com/foresightice/.

Verisight ICE. Accessed Dec. 28, 2021 https://www.accessdata.fda.gov/scripts/cdrh/cfdocs/cfpmn/p.

ICE Catheter—Biosense Webster/Stryker. Accessed Dec. 28, 2021 https://sustainability.stryker.com/products/in-the-ep-lab/intracardiac-echocardiography-catheter/.

Clinical Trials for ICE devices. U.S. National Library of Medicine. Accessed Dec. 28, 2021 https://clinicaltrials.gov/ct2/results?cond=intracardiac+echocardiography&term=&cntry=&state=&city=&dist=.

Yuda, et al. "Use of Cyclic Variation of Integrated Backscatter to Assess Contractile Reserve and Myocardial Viability in Chronic Ischemic Left Ventricular Dysfunction." ECHOCARDIOGRAPHY, vol. 19, No. 4, May 2002. pp. 279-287.

Bunting, et al. "Cardiac Lesion Mapping in vivo using Intracardiac Myocardial Elastography." IEEE Trans Ultrason Ferroelectr Freq Control. Jan. 2018. vol. 65, No. 1. pp. 14-20.

Chugh SS, Havmoeller R, Narayanan K, et al. Worldwide epidemiology of atrial fibrillation: a Global Burden of Disease 2010 Study. Circulation. 2014;129(8):837-847. doi:10.1161/CIRCULATIONAHA.113.005119.

Chugh SS, Blackshear JL, Shen WK, Hammill SC, Gersh BJ. Epidemiology and natural history of atrial fibrillation: clinical implications. J Am Coll Cardiol. 2001;37(2):371-378. doi:10.1016/s0735-1097(00)01107-4.

Benjamin EJ, Levy D, Vaziri SM, D'Agostino RB, Belanger AJ, Wolf PA. Independent risk factors for atrial fibrillation in a population-based cohort. The Framingham Heart Study. JAMA. 1994;271(11):840-844.

Eldar M, Canetti M, Rotstein Z, et al. Significance of paroxysmal atrial fibrillation complicating acute myocardial infarction in the thrombolytic era. SPRINT and Thrombolytic Survey Groups. Circulation. 1998;97(10):965-970. doi:10.1161/01.cir.97.10.965.

Grigioni F, Avierinos J-F, Ling LH, et al. Atrial fibrillation complicating the course of degenerative mitral regurgitation: determinants and long-term outcome. J Am Coll Cardiol. 2002;40(1):84-92. doi:10.1016/s0735-1097(02)01922-8.

Nattel S, Dobrev D. Electrophysiological and molecular mechanisms of paroxysmal atrial fibrillation. Nat Rev Cardiol. 2016;13(10):575-590. doi:10.1038/nrcardio.2016.118.

Van Gelder IC, Hagens VE, Bosker HA, et al. A comparison of rate control and rhythm control in patients with recurrent persistent atrial fibrillation. N Engl J Med. 2002;347(23):1834-1840. doi:10.1056/NEJMoa021375.

Chung MK, Shemanski L, Sherman DG, et al. Functional status in rate-versus rhythmcontrol strategies for atrial fibrillation: results of the Atrial Fibrillation Follow-Up Investigation of Rhythm Management (AFFIRM) Functional Status Substudy. J Am Coll Cardiol. 2005;46(10):1891-1899. doi:10.1016/j.jacc.2005.07.040.

Singh SN, Tang XC, Singh BN, et al. Quality of life and exercise performance in patients in sinus rhythm versus persistent atrial fibrillation: a Veterans Affairs Cooperative Studies Program Substudy. J Am Coll Cardiol. 2006;48(4):721-730. doi:10.1016/j.jacc.2006.03.051.

Calkins H, Hindricks G, Cappato R, et al. 2017 HRS/EHRA/ECAS/APHRS/SOLAECE expert consensus statement on catheter and surgical ablation of atrial fibrillation. Heart Rhythm. 2017;14(10):e275-e444. doi:10.1016/j.hrthm.2017.05.012.

M H, P J, Dc S, et al. Spontaneous initiation of atrial fibrillation by ectopic beats originating in the pulmonary veins. The New England journal of medicine. doi:10.1056/NEJM199809033391003.

Cosedis Nielsen J, Johannessen A, Raatikainen P, et al. Radiofrequency ablation as initial therapy in paroxysmal atrial fibrillation. N Engl J Med. 2012;367(17):1587-1595. doi:10.1056/NEJMoa1113566.

Morillo CA, Verma A, Connolly SJ, et al. Radiofrequency ablation vs antiarrhythmic drugs as first-line treatment of paroxysmal atrial fibrillation (RAAFT-2): a randomized trial. JAMA. 2014;311(7):692-700. doi:10.1001/jama.2014.467.

Verma A, Champagne J, Sapp J, et al. Discerning the incidence of symptomatic and asymptomatic episodes of atrial fibrillation before and after catheter ablation (DISCERN AF): a prospective, multicenter study. JAMA Intern Med. 2013;173(2):149-156. doi:10.1001/jamainternmed.2013.1561.

Lubitz SA, Fischer A, Fuster V. Catheter ablation for atrial fibrillation. BMJ. 2008; 336 (7648):819-826. doi:10.1136/bmj.39513.555150.BE.

Ouyang F, Antz M, Ernst S, et al. Recovered pulmonary vein conduction as a dominant factor for recurrent atrial tachyarrhythmias after complete circular isolation of the pulmonary veins: lessons from double Lasso technique. Circulation. 2005;111(2):127-135. doi:10.1161/01.CIR.0000151289.73085.36.

Shah, Shailee, Barakat Amr F., Saliba Walid I., et al. Recurrent Atrial Fibrillation After Initial Long-Term Ablation Success. Circulation: Arrhythmia and Electrophysiology. 2018;11(4):e005785. doi:10.1161/CIRCEP.117.005785.

Luik A, Radzewitz A, Kieser M, et al. Cryoballoon Versus Open Irrigated Radiofrequency Ablation in Patients With Paroxysmal Atrial Fibrillation: The Prospective, Randomized, Controlled, Noninferiority FreezeAF Study. Circulation. 2015;132(14):1311-1319. doi:10.1161/CIRCULATIONAHA.115.016871.

Andrade JG, Champagne J, Dubuc M, et al. Cryoballoon or Radiofrequency Ablation for Atrial Fibrillation Assessed by Continuous Monitoring: A Randomized Clinical Trial. Circulation. 2019;140(22):1779-1788. doi: 10.1161/CIRCULATIONAHA.119.042622.

Reddy VY, Dukkipati SR, Neuzil P, et al. Randomized, Controlled Trial of the Safety and Effectiveness of a Contact Force-Sensing Irrigated Catheter for Ablation of Paroxysmal Atrial Fibrillation: Results of the TactiCath Contact Force Ablation Catheter Study for Atrial Fibrillation (TOCCASTAR) Study. Circulation. 2015;132(10):907-915. doi:10.1161/CIRCULATIONAHA.114.014092.

(56) References Cited

OTHER PUBLICATIONS

Andrade JG, Khairy P, Guerra PG, et al. Efficacy and safety of cryoballoon ablation for atrial fibrillation: a systematic review of published studies. Heart Rhythm. 2011;8(9):1444-1451. doi:10.1016/j.hrthm.2011.03.050.

Vy R, M G, T DP, et al. Pulmonary Vein Isolation With Very High Power, Short Duration, Temperature-Controlled Lesions: The QDOT-FAST Trial. JACC. Clinical electrophysiology. doi:10.1016/j.jacep.2019.04.009.

Zhao X, Fu X, Blumenthal C, et al. Integrated RFA/PSOCT catheter for real-time guidance of cardiac radio-frequency ablation. Biomed Opt Express. 2018;9(12):6400-6411. doi:10.1364/BOE.9.006400.

Zhao X, Kilinc O, Blumenthal CJ, et al. Intracardiac radiofrequency ablation in living swine guided by polarization-sensitive optical coherence tomography. J Biomed Opt. 2020;25(5). doi:10.1117/1.JBO.25.5.056001.

Vergara GR, Vijayakumar S, Kholmovski EG, et al. Real-time magnetic resonance imaging-guided radiofrequency atrial ablation and visualization of lesion formation at 3 Tesla. Heart Rhythm. 2011;8(2):295-303. doi:10.1016/j.hrthm.2010.10.032.

Dana N, Di Biase L, Natale A, Emelianov S, Bouchard R. In vitro photoacoustic visualization of myocardial ablation lesions. Heart Rhythm. 2014;11(1): 150-157. doi:10.1016/j.hrthm.2013.09.071.

Stephens DN, Truong UT, Nikoozadeh A, et al. First in vivo use of a capacitive micromachined ultrasound transducer array-based imaging and ablation catheter. J Ultrasound Med. 2012;31(2):247-256. doi:10.7863/jum.2012.31.2.247.

Wickline S A, Thomas L J, Miller J G, Sobel B E, Perez J E. Sensitive detection of the effects of reperfusion on myocardium by ultrasonic tissue characterization with integrated backscatter. Circulation. 1986;74(2):389-400. doi:10.1161/01.CIR.74.2.389.

Milunski MR, Mohr GA, Wear KA, Sobel BE, Miller JG, Wickline SA. Early identification with ultrasonic integrated backscatter of viable but stunned myocardium in dogs. J Am Coll Cardiol. 1989;14(2):462-471. doi:10.1016/0735-1097(89)90203-9.

Milunski MR, Mohr GA, Perez JE, et al. Ultrasonic tissue characterization with integrated backscatter. Acute myocardial ischemia, reperfusion, and stunned myocardium in patients. Circulation. 1989;80(3):491-503. doi:10.1161/01.cir.80.3.491.

Yamada S, Komuro K. Integrated backscatter for the assessment of myocardial viability. Curr Opin Cardiol. 2006;21(5):433-437. doi:10.1097/01.hco.0000240578.05053.f9.

Dzeshka MS, Lip GYH, Snezhitskiy V, Shantsila E. Cardiac Fibrosis in Patients With Atrial Fibrillation: Mechanisms and Clinical Implications. J Am Coll Cardiol. 2015;66(8):943-959. doi:10.1016/j.jacc.2015.06.1313.

Zhu H, Zhang W, Zhong M, Zhang G, Zhang Y. Myocardial ultrasonic integrated backscatter analysis in patients with chronic atrial fibrillation. Int J Cardiovasc Imaging. 2010;26(8):861-865. doi:10.1007/s10554-010-9637-9.

Sasaki N, Okumura Y, Watanabe I, et al. Transthoracic echocardiographic backscatter-based assessment of left atrial remodeling involving left atrial and ventricular fibrosis in patients with atrial fibrillation. International Journal of Cardiology. 2014;176(3):1064-1066. doi:10.1016/j.ijcard.2014.07.138.

Lip GYH, Fauchier L, Freedman SB, et al. Atrial fibrillation Summary. Nature Reviews Disease Primers. 2016.

Ozenne V, Toupin S, Bour P, et al. Magnetic Resonance Imaging guided cardiac radiofrequency ablation. IRBM. 2015;36(2):86-91. doi:10.1016/j.irbm.2015.01.006.

Lee, Geoffrey, et al. High-density epicardial mapping of the pulmonary vein-left atrial junction in humans: insights into mechanisms of pulmonary vein arrhythmogenesis. Heart rhythm. doi:10.1016/j.hrthm.2011.09.010.

Krahn AD, Manfreda J, Tate RB, Mathewson FA, Cuddy TE. The natural history of atrial fibrillation: incidence, risk factors, and prognosis in the Manitoba Follow-Up Study. Am J Med. 1995;98(5):476-484. doi:10.1016/S0002-9343(99)80348.

Colilla S, Crow A, Petkun W, Singer DE, Simon T, Liu X. Estimates of current and future incidence and prevalence of atrial fibrillation in the U.S. adult population. Am J Cardiol. 2013;112(8):1142-1147. doi:10.1016/j.amjcard.2013.05.063.

Sayseng V, Grondin J, Salgaonkar VA, et al. Catheter Ablation Lesion Visualization With Intracardiac Strain Imaging in Canines and Humans. IEEE Trans Ultrason Ferroelectr Freq Control. 2020;67(9):1800-1810. doi:10.1109/TUFFC.2020.2987480.

Wyse DG, Waldo AL, DiMarco JP, et al. A comparison of rate control and rhythm control in patients with atrial fibrillation. N Engl J Med. 2002;347(23):1825-1833. doi:10.1056/NEJMoa021328.

L. Breiman, "Random forests," Machine Learning, vol. 45, pp. 5-32, Oct. 2001.

L. Breiman, "Manual on Setting Up, Using, and Understanding Random Forests V3.1," ed., 2002.

A. Karatzoglou, D. Meyer and K. Hornik, "Support Vector Machines in R," Journal of Statistical Software, vol. 15, Apr. 2006.

T. Hastie, R. Tibshirani and J. Friedman, "The Elements of Statistical Learning: Data Mining, Inference, and Prediction," Chapter 12. Second ed. New York, NY: Springer, 2009.

\* cited by examiner

ASSESSMENT OF ATRIAL MYOCARDIAL VIABILITY USING SPECTRAL ANALYSIS OF ULTRASOUND

CROSS-REFERENCE TO RELATED APPLICATIONS

This application claims priority to U.S. Provisional Patent Application 63/121,664 filed on Dec. 4, 2020, the entirety of which is incorporated herein by reference.

BACKGROUND

Atrial fibrillation (AF) is among the most common health conditions, with an estimated global prevalence of 33.5 million individuals. Studies have also shown that the incidence and prevalence of AF continue to increase each year. While this condition is uncommon among children and healthy adults, the risk of AF increases with advancing age and comorbidities. Among the many risk factors for AF are hypertension, diabetes, coronary artery disease, and valvular disease.

The defining feature of AF is uncoordinated and rapid electrical and mechanical activity of the atria. The generation of AF requires both a trigger for initiation and a substrate for maintenance. The trigger is an electrical focus for aberrant initiation of electrical activity, commonly located within the pulmonary veins. The substrate is the portion of tissue responsible for propagation of the aberrant electrical signals. Generation of a vulnerable substrate is likely multifactorial as a result of genetic predisposition, fibrosis, inflammation, altered neurohormonal regulation, and cardiac remodeling.

One treatment option for AF is catheter ablation. The goal of catheter ablation is electrical neutralization of arrhythmogenic ectopic foci that trigger AF by scarring myocardial tissue to disrupt electrical conductivity. In patients with otherwise normal hearts, greater than 90% of ectopic foci are within the pulmonary veins. These foci primarily originate from fibers of atrial muscle that extend roughly 2-4 cm into the pulmonary veins. Direct ablation of these foci, however, is limited by 1) the technical challenges of ablating foci within small pulmonary veins, and 2) difficulty identifying foci at the time of the procedure among patients not currently experiencing AF. As a result, the technique of pulmonary vein isolation (PVI) was developed. During PVI, a cardiologist creates contiguous circumferential ablative lesions around the ostia of the pulmonary veins to electrically isolate them from the left atrium. In effect, this prevents any ectopic focus from triggering AF within the left atrium. Additional ablation may be required if further foci are identified outside of the pulmonary veins. Although this method has been successful, electrical reconnection of any portion of the circumferential ablative lesions allows ectopic foci within the pulmonary veins to trigger recurrent episodes of AF.

Two strategies have been utilized to ensure adequate lesion formation and prevention of electrical reconnection: 1) improving lesion formation by ensuring ablative lesions have adequate depth while minimizing the risk of complications; and 2) improving ablation monitoring in an effort to inform physicians in real-time regarding the adequacy of the lesion created. For example, according to one approach, intraoperative voltage mapping of cardiac tissue during atrial ablation monitors electrical conductivity of the tissue being ablated in conjunction with intracardiac echocardiography (ICE) for visualization of the heart. However, this technique cannot differentiate between viable yet temporarily electrically inactive myocardium and adequately ablated non-viable myocardium. In other words, such monitoring is sensitive only to electrical activity and not to long term tissue viability.

Some real-time ablation lesion monitoring and durability prediction techniques are based on the application of optical coherence tomography (OCT), which is an imaging method that uses backscattered light waves to capture high resolution images. In these techniques, polarization-sensitive OCT (PSOCT) catheters are integrated with RF ablation catheters. However, these combined catheters have not yet been tested in human studies. Further, OCT imaging requires close proximity to the tissue of interest, which necessitates the integration of catheters. But such integration alters the maneuverability of, and operator experience with, the ablation catheter. Additionally, the current imaging depth of PSOCT for the monitoring of lesions is roughly 1 mm, which can be exceeded by the required depth of ablative lesions in the heart. Therefore, there may be situations in which this technology is unable to fully visualize lesions.

Still further, other techniques such as real-time magnetic resonance imaging (MM) and photoacoustic monitoring are also limited. For example, MRI is expensive, requires specialized equipment, and has a low resolution; and photoacoustic monitoring requires a large transducer, and remains limited in its resolution capabilities. Integrated ultrasound probes suffer from similar limitations, and are generally further limited to one dimension, which requires careful alignment of the imaging plane with the predominant direction of myocardial motion at the site of the lesion. This can be difficult for the ultrasound operator, especially given the rotation and contraction of the myocardium during the cardiac cycle.

Considering these deficiencies in existing ablation technology, undertreatment can frequently occur. As a result, roughly one-third of all ablation procedures need to be repeated.

BRIEF SUMMARY

According to one example of the present disclosure, a method of treatment comprises: ultrasonically insonifying a portion of myocardial tissue in a patient; measuring a backscatter signal of ultrasonic waves backscattered from the portion of myocardial tissue; determining a spectral parameter of the backscatter signal; correlating a value of the spectral parameter with an electrical conductivity of the portion of myocardial tissue; and adjusting a treatment of the patient based on the correlation.

In various embodiments of the above example, the method further comprises, prior to insonifying the portion of myocardial tissue: ablating the portion of myocardial tissue, thereby disrupting the electrical conductivity of the portion of myocardial tissue, wherein adjusting the treatment of the patient comprises re-ablating the portion of myocardial tissue or ablating a second portion of myocardial tissue, a location of the ablated portion of myocardial tissue being different than a location of the second portion of myocardial tissue; said spectral parameter is an integrated backscatter or a cyclic variation of integrated backscatter, of an effective backscatter transfer function; said spectral parameter is an intercept or a cyclic variation of intercept, of a fit of an effective backscatter transfer function; said spectral parameter is a slope or a cyclic variation of slope, of a fit of an effective backscatter transfer function; the method further comprises inputting the spectral parameter to a machine learning system, the machine learning system being trained to output a state of the portion of myocardial tissue, the electrical conductivity of the portion of myocardial tissue, or a treatment of the patient, based on the input spectral parameter; and adjusting the treatment of the patient based on the output from the machine learning system; the machine learning system comprises a single-tree, random-forest, or support vector machine; adjusting the treatment of the patient comprises re-ablating the portion of myocardial tissue until the spectral parameter is minimized; the method further comprises: determining a plurality of spectral parameters, correlating values of the plurality of spectral parameter with an electrical conductivity of the portion of myocardial tissue, and adjusting a treatment of the patient based on the correlations; and/or the plurality of spectral parameters comprise two or more parameters selected from the group consisting of: integrated backscatter, cyclic variation of integrated backscatter, slope, cyclic variation of slope, intercept, and cyclic variation of intercept, the parameters being, of an effective backscatter transfer function or a fit of the effective backscatter transfer function.

According to a second example of the present disclosure, a method of treating atrial fibrillation comprises: ultrasonically insonifying a plurality of portions of myocardial tissue in a patient, each of the plurality of portions of myocardial tissue being at a different location of the myocardial tissue; for each of the plurality of portions of myocardial tissue: measuring a backscatter signal of ultrasonic waves backscattered from the corresponding portion of myocardial tissue; determining a spectral parameter of the corresponding backscatter signal; and correlating a value of the spectral parameter with an electrical conductivity of the corresponding portion of myocardial tissue; determining an ablation location based on the correlations, the ablation location being one of the plurality of portions of myocardial tissue; and ablating the myocardial tissue at the ablation location.

In various examples of the second disclosure, the method further comprises, after ablating the myocardial tissue: ultrasonically insonifying the ablation location, measuring a backscatter signal of ultrasonic waves backscattered from the ablation location, determining a post-ablation spectral parameter of the backscatter signal, correlating a value of the post-ablation spectral parameter with an electrical conductivity of the ablation location, and re-ablating the ablation location or ablating a different portion of myocardial tissue; said spectral parameter is an integrated backscatter or a cyclic variation of integrated backscatter, of an effective backscatter transfer function; said spectral parameter is an intercept or a cyclic variation of intercept, of a fit of an effective backscatter transfer function; said spectral parameter is a slope or a cyclic variation of slope, of a fit of an effective backscatter transfer function; the method further comprises, for each of the plurality of portions of myocardial tissue, inputting the spectral parameter to a machine learning system, the machine learning system being trained to output a state of the corresponding portion of myocardial tissue, the electrical conductivity of the corresponding portion of myocardial tissue, or a determination of whether to ablate the corresponding portion of myocardial tissue; and/or the machine learning system comprises a single-tree, random-forest, or support vector machine.

DETAILED DESCRIPTION

Figure 1:
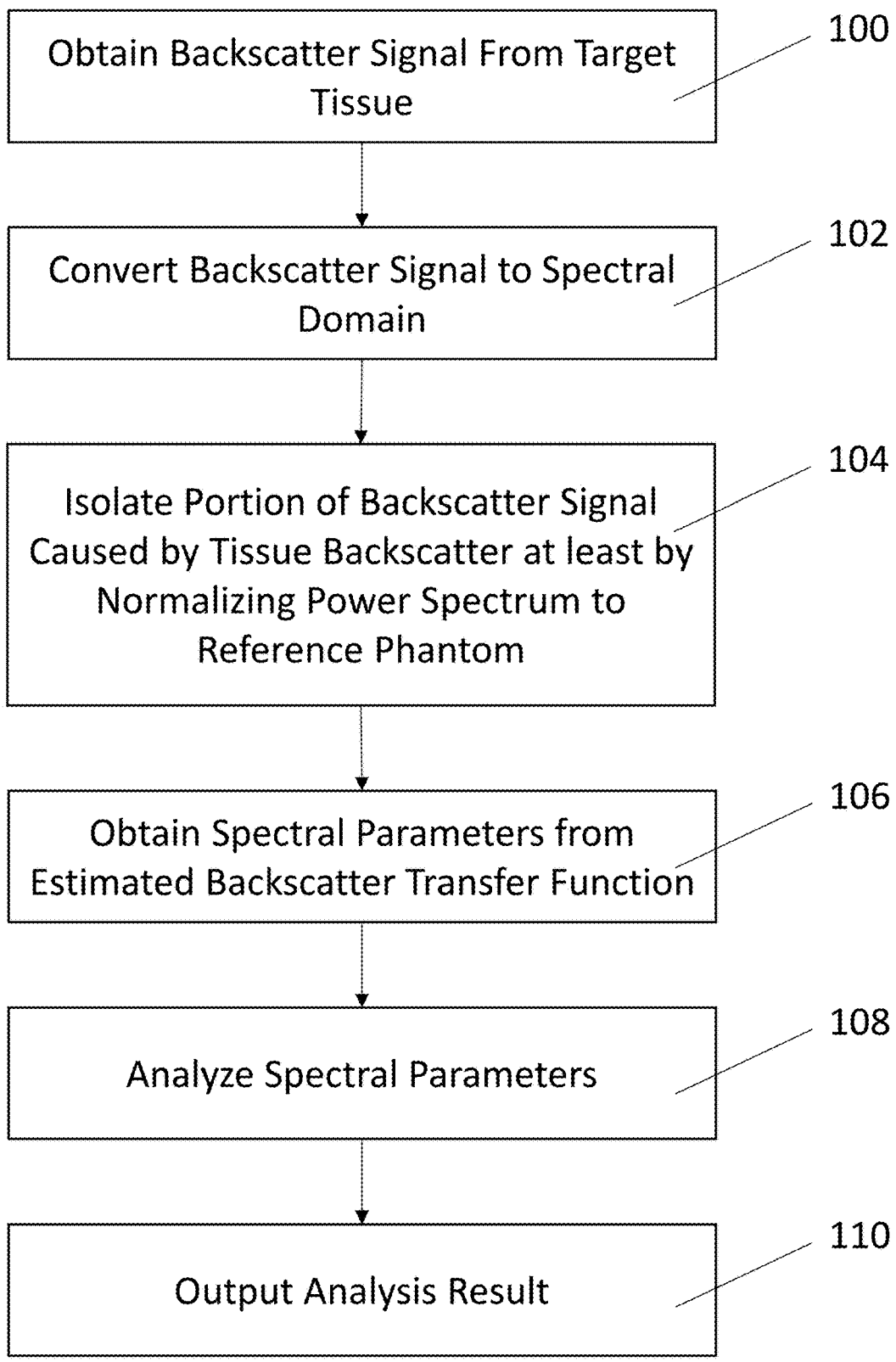
FIG. 1 is a flow chart of an example method for analyzing myocardial tissue via ultrasound backscatter.

The present disclosure relates to the monitoring of cardiac tissue for ablative procedures, and more generally, to the assessment of myocardial (e.g., atrial) tissue viability. The present disclosure thus provides a robust measurement of ablation lesion formation and durability (and the planning thereof) with reasonable resolution that can be easily implemented into the existing workflow of practicing clinicians, and that can be performed in near real-time in a manner that is not excessively time consuming.

The above can be realized by the spectral analysis of intracardiac ultrasound. One use of spectral analysis of ultrasound is to characterize myocardial tissue according to spectral parameters of a backscatter of the incident ultrasound signal. The spectral parameters may be characteristics of the backscatter curve (or an estimation or fit thereof), or of an integration of the backscatter curve (an integrated backscatter (IB), which is a measure of the grayscale intensity of an ultrasound image). Further, the characterization may relate to a cyclic variation of a spectral parameter, where the variation indicates changes in the spectral parameter (e.g., a change in the IB) over all or a portion of the cardiac cycle caused by the natural patterns of contraction and relaxation throughout the heart cycle.

These spectral parameters can be indicative of particular aspects of atrial fibrillation (AF) and the ablation procedure, and thus used for planning an ablative procedure and/or for monitoring progress and/or guiding such a procedure. For example, the magnitude of a cyclic variation of integrated backscatter (CVIB) is rapidly blunted following myocardial ischemia, and the phase of the backscatter signal is delayed. Additionally, the magnitude and phase recover more quickly than wall thickening, and a decrease in CVIB magnitude correlates well with the degree of ischemic injury. According to one canine experiment, a 15 minute ischemic injury resulted in rapid reduction in the magnitude of CVIB, which completely recovered after 20 minutes despite decreased wall thickness persisting for the entirety of the 2 hour experiment. Accordingly, where a structural analysis of the myocardium would suggest a successful ablation, a spectral parameter analysis would indicate that further action (e.g., further ablation) should be taken. Further, integrated backscatter alone can be an objective measure of myocardial fibrosis, and the CVIB magnitude is significantly higher in the posterior wall of the left atrium of patients with AF compared to those without, likely reflecting an increased scar burden from chronic AF.

Considering the above, the systems and methods described herein utilize spectral parameters of ultrasound backscatter to identify fibrosis and accurately assess myocardial viability. As applied to ablation and AF, these systems and methods can identify scars and detect differences in atrial myocardium before and after ablation procedures, thereby facilitating planning for, and monitoring of, the ablation procedure in a manner that limits AF recurrence. In other words, the spectral parameters of ultrasound can be used to determine and monitor tissue viability in the setting of ablative injury, and to distinguish pre-existing scar tissue, healthy unablated myocardium, and recently ablated myocardium.

An example of such a method is illustrated with respect to FIG. 1. Therein, an ultrasound backscatter signal is first obtained 100 from a target tissue. In one embodiment, the signal is obtained from an ultrasound intracardiac echocardiography (ICE) catheter. The ICE catheter generally sits in the right atrium during the ablation procedure to monitor the procedure's progress, or during a diagnostic and/or planning procedure prior to ablation. However, in some embodiments, it may puncture the septum with other catheters used during the procedure. The ICE catheter emits ultrasound waves into adjacent tissue (e.g., a portion of the myocardium), which are then reflected by the various structures of the tissue. The reflected waves (the backscatter) are then detected by the catheter and transduced to electrical signals. Those electrical signals may then be transmitted by the ICE catheter to a computer or like processor for further analysis.

The present disclosure may be applied before, during, or after an ablation procedure for diagnostics, monitoring, guidance, and/or evaluation. Accordingly, the ultrasound backscatter signal can be obtained 100 at any time period before, during, or after the ablation procedure. Further, the spectral parameters discussed herein may be determined at a particular time period during the cardiac cycle, or as a cyclic variation with respect to the cardiac cycle. Accordingly, the backscatter signal may be obtained at an individual point in time in the cardiac cycle (e.g., at a peak of systole, end of diastole, or the like), or may be obtained at a plurality of points of the cardiac cycle or continuously during the cardiac cycle, and the change between the plurality of points determined.

As the backscatter signal is obtained 100 in the time domain from the target tissue, it is next converted to the frequency domain 102 to facilitate deconvolution and isolation of the backscatter transfer function. The backscatter time domain signal is a convolution of effects arising from transmit and receive electronics, the transducer, attenuation of overlying tissue, diffraction patterns, and the backscatter characteristics of the target tissue. Transformation 102 may be performed by a Fourier transform, a Yule-Walker autoregressive spectral estimation, or other like techniques known to those of ordinary skill in the art. This spectral estimation changes the convolutions into a series of multiplications of transfer functions under the assumption of linear propagation, transmission, and reception of the ultrasound wave, single scattering (i.e., the Born approximation), and a constant speed of sound for all tissues, the power spectrum $S(f, d, \varphi)$ of received signals scattered at given depth d within the focal zone for a homogenous propagation medium may be represented according to:

$$S(f,d,\varphi,m)=G(f)D(f,d,\varphi)A(f,d)B(f,m) \quad (1)$$

where f is the RF frequency of the backscatter signal, G(f) represents transmit and receive transfer function of the transducer and any system electronics, $D(f, d, \varphi)$ represents the effects of diffraction where $\varphi$ is the angle of the transmit/receive line with respect to a transducer array, A(f, d) represents an overlying attenuation, and B(f, m) represents the backscatter transfer function for a relative angle m of the myocardium fibers with respect to the ultrasound wave. In Equation (1), the depth d is variable and related to a round trip time t for the ultrasound to be scattered from the target area according to:

$$d = c\frac{t}{2} \quad (2)$$

where c is the speed of sound.

Because the power spectrum of the backscatter signal includes effects from more than just the backscatter characteristics of the target tissue, the portion of the backscatter signal caused by tissue backscatter (e.g., the backscatter transfer function B(f,m)) is next isolated 104. This isolation is performed at least by normalizing the power spectrum $S(f, d, \varphi)$ to a reference phantom.

The reference phantom may be a generalized signal representative of the system transfer functions and/or other components of the signal, such that normalization of a spectrum to the phantom effectively mitigates or removes the system transfer function components from the target power spectrum so that the resulting spectrum is primarily influenced (or influenced as much as possible) by the backscatter transfer function B(f, m). This resulting normalized power spectrum is referred to herein as the effective backscatter transfer function eBTF, and may be log-scaled. In some embodiments normalization may be performed by subtracting the reference phantom spectrum in decibels (dB) from the backscatter power spectrum in dB $S(f, d, \varphi)$; however, any normalization technique may be applied. The effects of diffraction and attenuation (which can be minimal at desired operating frequencies where the signal path is primarily blood) can be ignored; however, these effects can be compensated for with additional signal processing techniques such as those based on mathematical models, phantom measurements, or segmentation of the ultrasound path into tissues with known properties such as blood and myocardium.

In one embodiment, the reference phantom signal may correspond to a backscatter signal from a 'generic' ultrasound device for 'normal' tissue, and thus the components of a backscatter signal can be unrelated to the tissue being analyzed. This reference phantom may be determined as an average (or other statistical parameter) of backscatter signals from one or more ICE catheters or like ultrasound devices (and any corresponding processing devices) from one or more uninjured myocardial tissues. However, generation of the reference phantom signal is not limited to in vivo data collection, and instead may be a signal derived from a backscatter model. In some embodiments, the reference phantom is not necessarily based on backscatter from tissue, and instead may represent backscatter from a steel plate, glass plate, or the like.

Still further, the reference phantom does not need to be determined from the same device from which a backscatter signal is obtained 100. In other words, the average power spectrum does not significantly vary between different catheter devices and therefore the reference phantom may be generic to applications of the present disclosure on any system. Of course, device specific phantoms may also be utilized. For example, intensity differences between various catheters may be normalized. In one example embodiment, an integrated backscatter value or like spectral parameter may be determined for each type of catheter, and then subtracted from any power spectra collected using that catheter.

Figure 2:
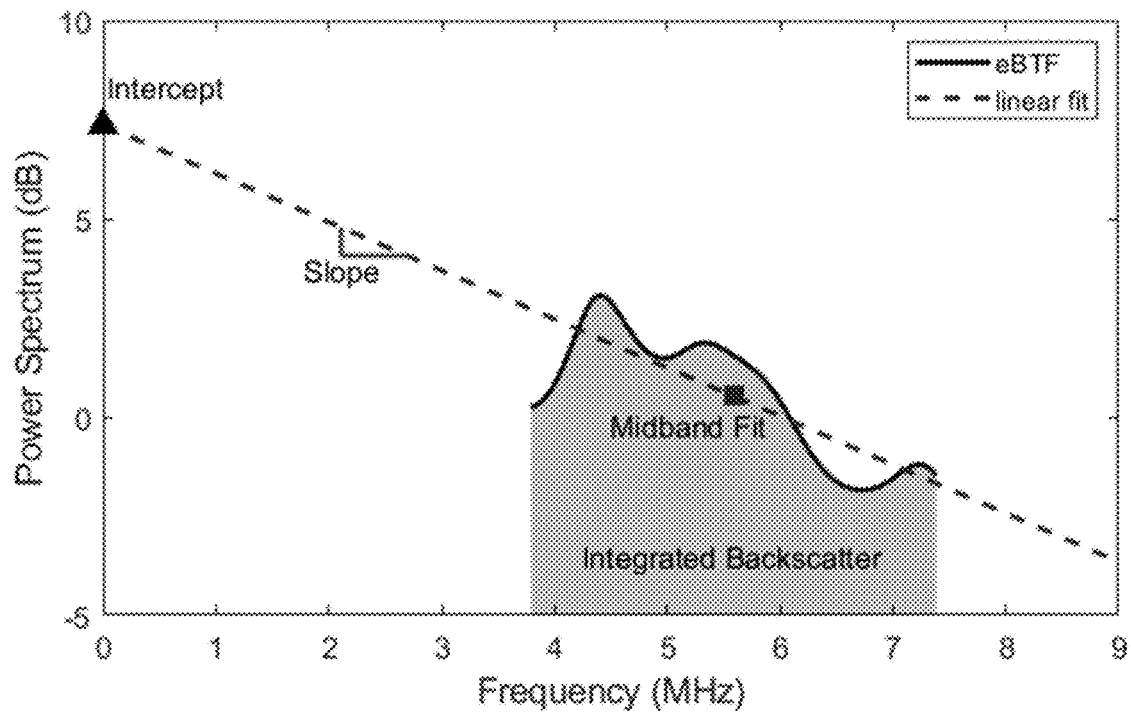
FIG. 2 is a depiction of a log-scaled effective backscatter transfer function eBTF and linear fit thereof, graphically illustrating various spectral parameters.

With the above simplifications and processing, the eBTF is primarily sensitive to the scattering properties of the target tissue, and other components of the backscatter signal are minimized. Once the effective backscatter transfer function eBTF is determined, it may be processed to determine spectral parameters of the backscatter. The parameters that can be extracted from the eBTF include those of a linear (or other) fit (e.g., slope and intercept), an area under the eBTF curve, and parameters of the eBTF curve itself (e.g., maxima and minima and their associated frequencies). FIG. 2 graphically illustrates these parameters.

Figure 3:
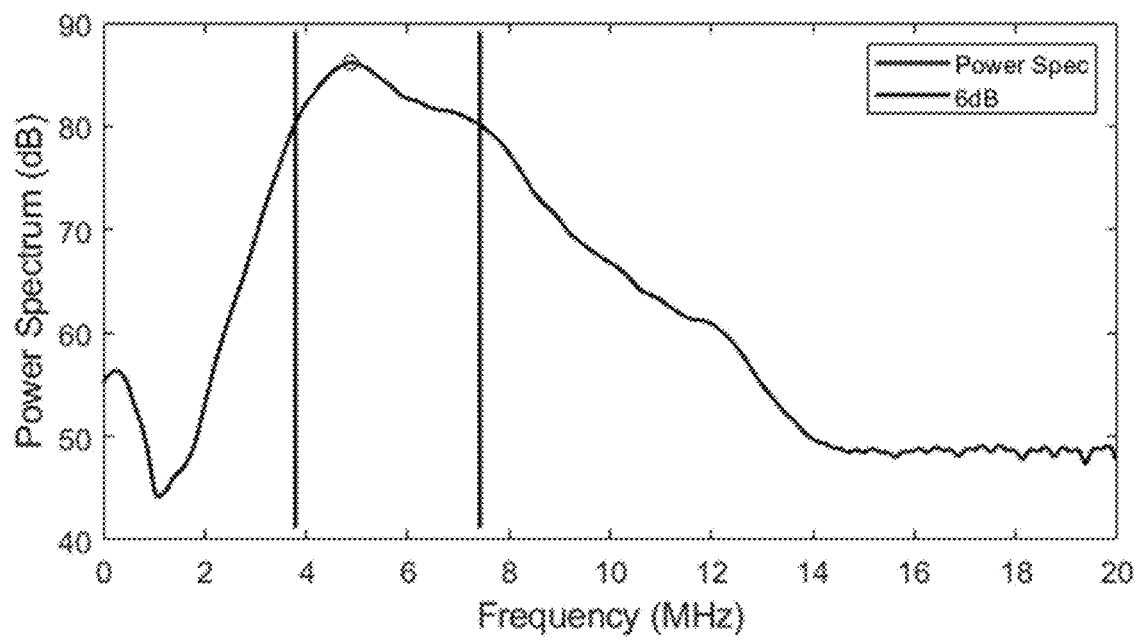
FIG. 3 is a plot of an example power spectrum of a backscatter signal, and the frequencies corresponding to the power spectrum six decibels from its maximum.

As seen in FIG. 2, an example effective backscatter transfer function eBTF is shown by the solid line extending from about 3.8 MHz to about 7.4 MHz. Although the bandwidth of the eBTF shown in FIG. 2 is 3.6 MHz, other bandwidths may be considered, and those bandwidths may be shifted to lower or higher frequencies. For example, the bandwidth may be determined according to any statistical determination of the power spectrum S(f, d) and/or its components. In one embodiment illustrated in FIG. 3, the upper and lower bounds of the eBTF signal (and thus the resulting bandwidth) may be determined by the frequencies at which the reference power spectrum is within a predetermined range of its maximum. In the example of FIG. 3, the range is 6 dB as indicated by the vertical marks on the plot at about 3.8 MHz and 7.4 MHz bounding the maximum of the power spectrum at about 4.5 MHz. In other embodiments, the range may be 3, 10, 12, or 20 dB or another decibel level. The range from which the bandwidth is determined may be based on a signal-to-noise ratio. For example, if a signal contains a relatively large amount of noise, the bandwidth may be chosen to narrow the band in order to exclude regions that contain mostly noise within the eBTF. Or if a signal-to-noise ratio of an obtained signal is relatively low, a smaller bandwidth may be used to minimize the impact of noise on the decision process.

As noted above, spectral parameters may be determined directly from the effective backscatter transfer function eBTF curve itself. For example, one parameter may be the integral of the effective backscatter transfer function eBTF over the entire bandwidth (thus representing the entire area under the eBTF curve). Such an integration area is illustrated in FIG. 2 by the shading underneath the eBTF curve. In other embodiments, the integration may only be over a lower-half, or upper-half of the bandwidth. In still other embodiments, the spectral parameter may be determined as the ratio of the integrated backscatter in the upper half of the bandwidth to the integrated backscatter in the lower half of the bandwidth (or vice versa). Still further, the parameters may be determined according to the extremes of the effective backscatter transfer function eBTF. For example, the parameter may be a local or global maximum or minimum value of the eBTF, and/or the frequency (or frequencies) at which the maximum/minimum occur.

As further seen in FIG. 2, a 'linear fit' of the eBTF curve is shown by the dashed line. The 'linear fit' is determined as a linear regression of the backscatter transfer function eBTF curve. As also noted above, the slope, and the Y-intercept of this linear fit may be determined as spectral parameters. The mid-band value spectral parameter is the value of the linear fit at a mid-band point (e.g., 5.6 MHz) of the eBTF signal. While a linear regression is illustrated in FIG. 2, other regressions (e.g., polynomial or Bayesian) may be implemented, and similar features of those fits may be determined as a spectral parameter discussed herein.

Spectral parameters may also be based on two-dimensional spectral transforms of the obtained backscatter signal. Similar to the above-described single dimensional parameters, the two-dimensional parameters may be determined from a radially integrated spectral power. Such parameters may include a peak value and/or a 3 dB bandwidth. Again, the bandwidth (and resulting parameter) may be determined based on a width with respect to the peak value (e.g., 6, 10, 12, or 20 dB). Other two-dimensional parameters may be based on an angularly integrated spectral power, and include slope and intercept values from the subsequent curve.

While the above-discussed parameters are based on a single obtained backscatter signal (and thus representative of the point in time at which the backscatter signal was obtained), spectral parameters may also be determined over a period of a time, or based on a change of such a parameter between points in time due to the natural patterns of contraction and relaxation throughout heart cycle. Such cyclic variations can be represented by a change in magnitude and/or phase of the corresponding parameter. The magnitude of the cyclic variation may be determined by any statistical measure of the corresponding parameter at two points in time in the cardiac cycle. For example, the cyclic variation may be represented as the difference between the minimum and maximum values of the parameter within a cardiac cycle (e.g., an R-R cycle), an average of the parameter over a cardiac cycle, a ratio of a maximum and minimum of the parameter during the cycle, or the like. The phase of the cyclic variation may be represented by the fraction of an ECG signal between the maximum (or minimum) measure and a specific point in the ECG cycle, such as end diastole.

According to one example, the cyclic variation of integrated backscatter (CVIB) may be based on a normalized time delay (a surrogate for phase) and phase-corrected magnitude. The normalized time delay is the interval between the QRS complex of an ECG signal and the nadir of the CVIB tracing, divided by the QT interval for the cardiac cycle. This is a dimensionless measure that estimates the phase of the CVIB. The upper limit of the normalized time delay is about 1.2. When normalized time delay values exceed 1.2, the corresponding magnitude of the CVIB is multiplied by −1 to produce a phase-corrected magnitude.

In sum, the spectral parameter may be one or more of: an integral of the effective backscatter transfer function eBTF over a portion or all of the bandwidth of the eBTF, a ratio of integrals over different frequency ranges in the bandwidth of the eBTF, or maxima and minima of the eBTF curve; a slope, intercept, mid-band value, or other characteristic of a fit (such as a linear regression) of the effective backscatter transfer function eBTF; and two-dimensional parameters of the effective backscatter transfer function eBTF. These spectral parameters may be gated to a particular point of cardiac cycle, and thus derived from a backscatter signal obtained at that point of the cardiac cycle. These spectral parameters may also be the cyclic variations thereof. It is further noted that these spectral parameters are merely exemplary and are not intended to be limiting. Rather, any other parameter determined by statical analysis of the effective backscatter can be used according to the present disclosure.

Returning then to FIG. 1, after the spectral parameter(s) is determined, it may be analyzed 108 and a result of the determination and/or analysis may be output to a user 110. That is, as suggested above, the determined parameter may be indicative of a state of the target tissue such as the myocardium and/or a success of an ablation. Accordingly, the determined parameter and its value, and/or a meaning of the determined parameter's value can be output to a user such as a physician. The physician may then determine how to proceed (e.g., whether to ablate or re-ablate the tissue at the same or a different location) based on the output parameter value. In some embodiments, such a recommended action may also or alternatively be output. For example, a parameter value may be compared to a threshold level to determine whether ablation of the tissue from which the parameter was obtained should be recommended. Based on the comparison, the determined recommendation may be output. A discussion of the physiological meanings of various spectral parameter values is given below. In some embodiments, the comparisons may be made to spectral parameters determined prior to the ablation procedure. For example, a baseline (pre-ablation) spectral parameter may be identified in a patient. Then during ablation, the same spectral parameter may be determined (as a post-ablation spectral parameter), and the ablation procedure continued until a desired value of the parameter is obtained. For example, ablation may be continued until the magnitude of the cyclic variation of integrated backscatter is less than 7 dB.

Figure 4:
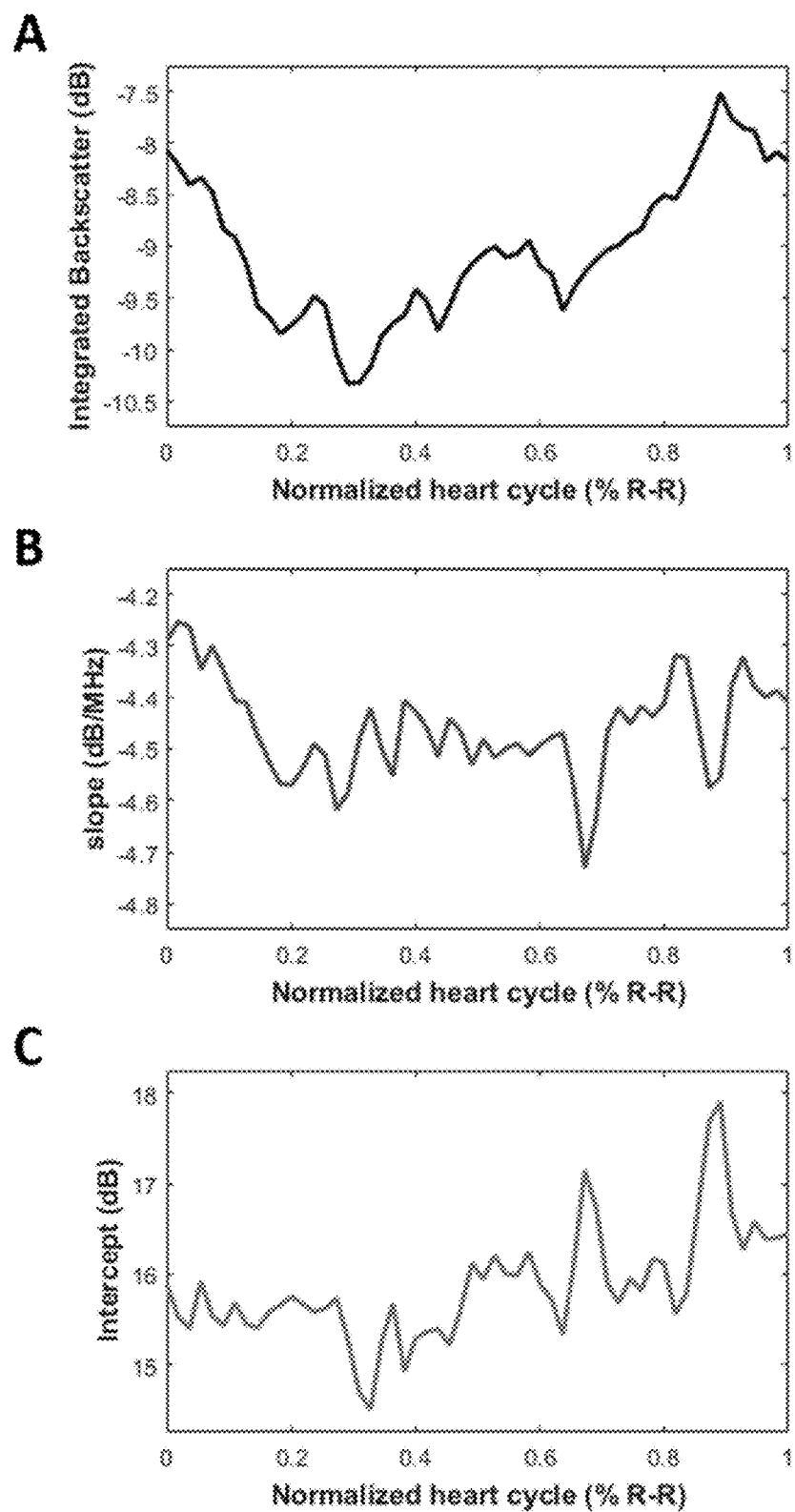
FIG. 4 illustrates a cyclic variation of integrated backscatter (A), slope (B), and intercept (C) normalized to the heart cycle in unablated myocardium.

FIG. 4 illustrates variations of integrated backscatter in panel (A), of slope in panel (B), and of intercept in panel (C) as a combined average from un-ablated, normal myocardium of sixteen subjects, normalized to the R-R cycle. These curves thus represent cyclic variations of the integrated backscatter (CVIB), slope (CVIS), and intercept (CVI), respectively. The average magnitude of the CVIB in normal atrial tissue was 8.9 dB and the normalized time delay was 0.98, with a phase-corrected magnitude of 4.7 dB. The average magnitude of the CVS was 1.6 dB/MHz and the normalized time delay was 1.23. The average magnitude of the CVI was 14.0, and the time delay was 1.0.

A comparison of the integrated backscatter (IB), slope, and intercept from unablated atrial myocardium in subjects with paroxysmal vs persistent AF is shown in Table 1. As seen therein, there are statistically significant differences in the IB, slope, and intercept between subjects with paroxysmal and persistent AF. The greatest difference in IB between the two groups was at end-diastole (−4.6 vs −13.4 dB, p=0.014), the greatest difference in slope was at end-systole (−4.2 vs −5.0 dB/MHz, p=0.010), and the greatest difference in intercept was at end atrial diastole (19.6 vs 12.8 dB, p=0.027). Utilizing data from end-diastole did not necessarily maximize differences in spectral parameters. However, gating to this part of the cardiac cycle maximized the performance of all parameters.

TABLE 1

| Cardiac Cycle | Paroxysmal | Persistent | Difference | P-value |
| --- | --- | --- | --- | --- |
| Integrated Backscatter (dB) | | | | |
| End Diastole | −4.6 | −13.4 | 8.8 | 0.014 |
| End Systole | −7.1 | −14.6 | 7.5 | 0.014 |
| End Atrial Diastole | −5.3 | −13.5 | 8.1 | 0.014 |

TABLE 1-continued

| Cardiac Cycle | Paroxysmal | Persistent | Difference | P-value |
| --- | --- | --- | --- | --- |
| Slope (dB/MHz) | | | | |
| End Diastole | −4.2 | −4.7 | 0.5 | 0.048 |
| End Systole | −4.2 | −5.0 | 0.8 | 0.010 |
| End Atrial Diastole | −4.5 | −4.7 | 0.3 | 0.103 |
| Intercept (dB) | | | | |
| End Diastole | 19.0 | 12.8 | 6.3 | 0.027 |
| End Systole | 16.4 | 13.1 | 3.3 | 0.103 |
| End Atrial Diastole | 19.6 | 12.8 | 6.7 | 0.027 |

Figure 5:
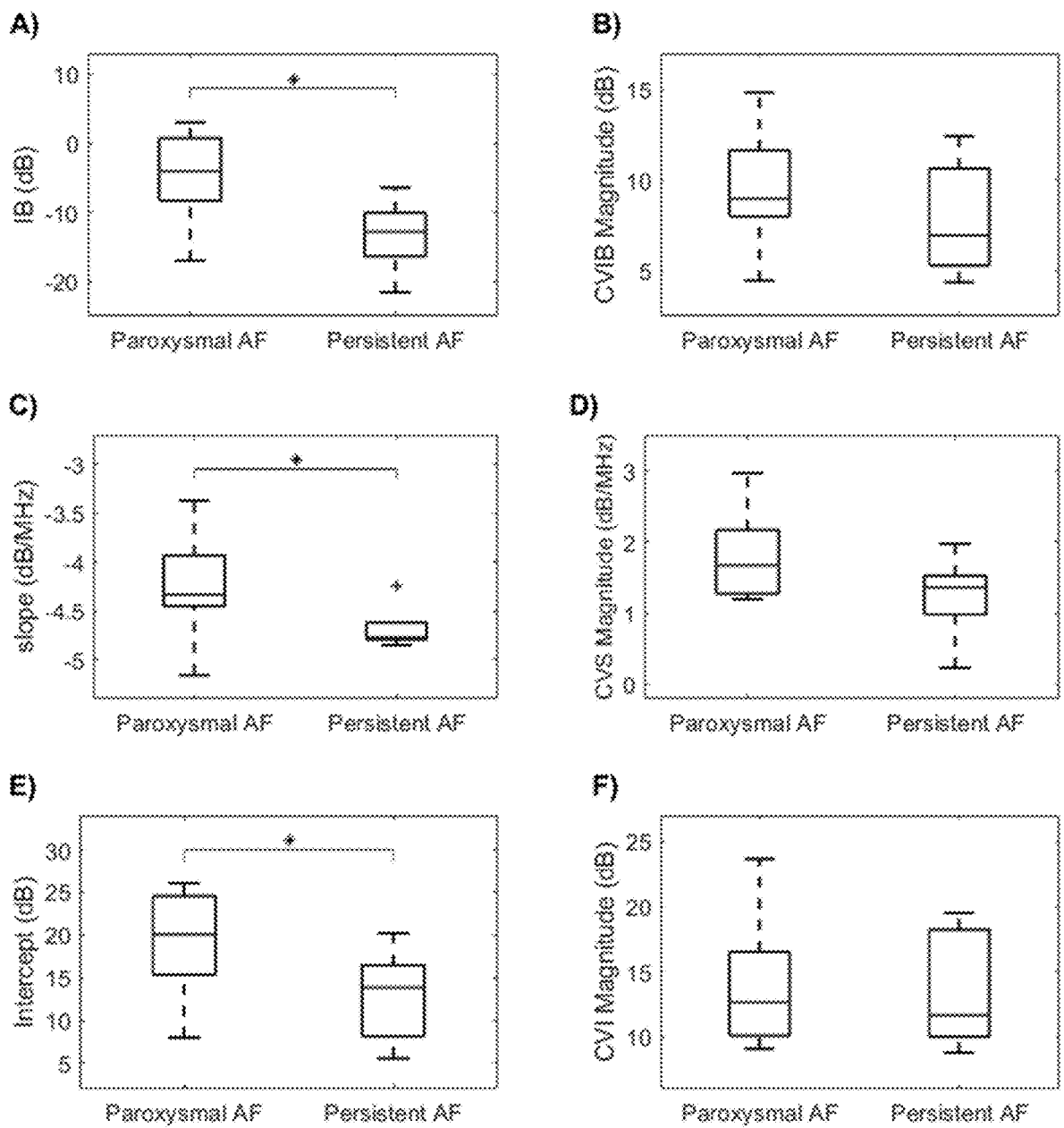
FIG. 5 illustrates the distribution of six spectral parameters between unablated atrial myocardium of subjects with paroxysmal AF and patients with persistent AF.
Figure 6:
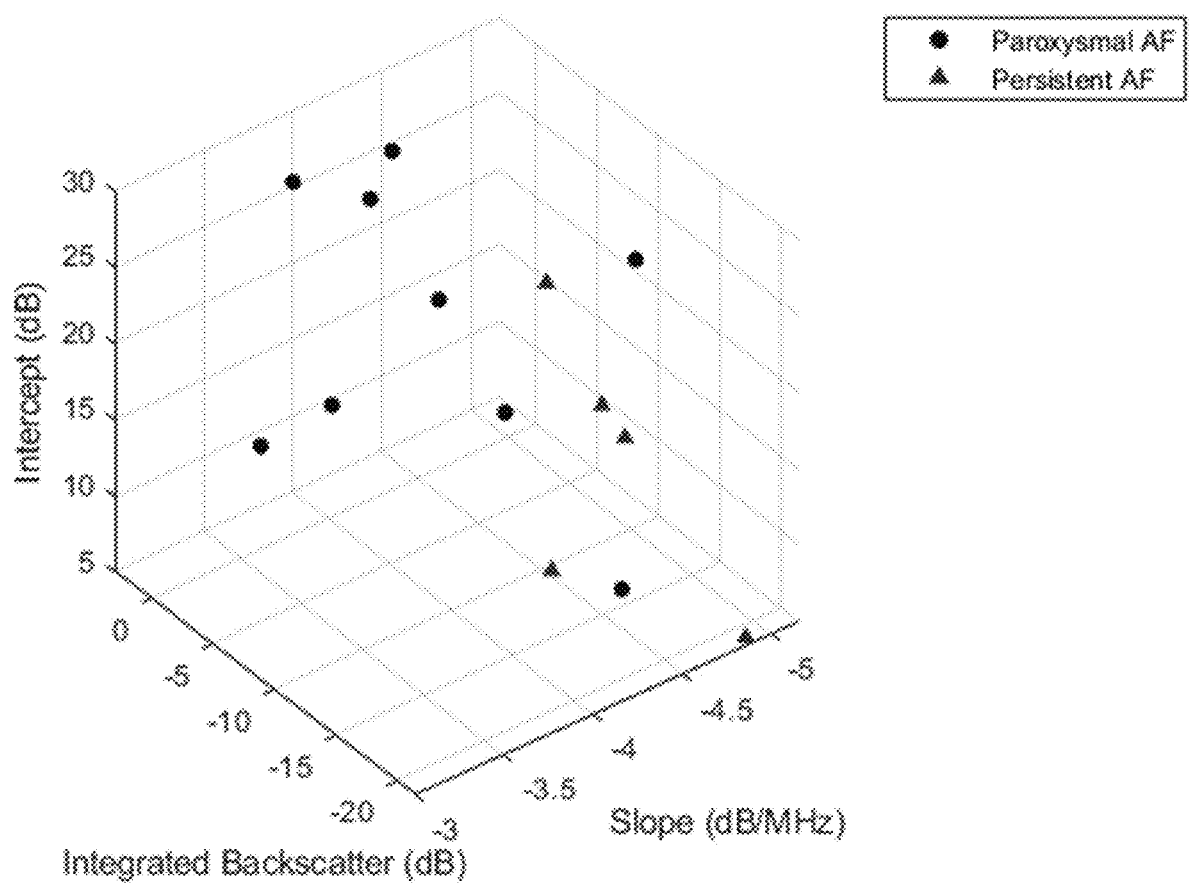
FIG. 6 is a three-dimensional plot of statistically significant spectral parameters of subjects with either paroxysmal or persistent AF.

FIG. 5 and Table 2 further illustrate the distribution of spectral parameters of unablated atrial myocardium of nine subjects with paroxysmal AF and five patients with persistent AF (*=p-value<0.05). The IB (panel (A)), slope (panel (C)), and intercept (panel (E)) are gated to end diastole. As seen therein, there are significant differences in IB, slope, and intercept. FIG. 6 further provides a three-dimensional visualization of the separation of paroxysmal and persistent AF on the basis of these spectral parameters (IB, slope, and intercept). As further seen in FIG. 5 and Table 2, there were no significant differences in the magnitude of the cyclic variation of any parameters (panels (B), (D), and (F)), nor the normalized time delay or phase corrected magnitude of CVIB, for unablated myocardium for subjects with paroxysmal and persistent AF.

TABLE 2

| Parameter | Paroxysmal | Persistent | Difference | P-Value |
| --- | --- | --- | --- | --- |
| IB (dB) | −4.6 | −13.4 | 8.8 | 0.014 |
| Slope (dB/MHz) | −4.2 | −4.7 | 0.5 | 0.048 |
| Intercept (dB) | 19.0 | 12.8 | 6.2 | 0.027 |
| CVIB (dB) | 9.59 | 7.87 | 1.72 | 0.159 |
| Phase-corrected CVIB (dB) | 4.22 | 5.64 | −1.42 | 0.473 |
| CVIB time delay | 1.02 | 0.90 | 0.12 | 0.103 |
| CVS (dB/MHz) | 1.85 | 1.24 | 0.61 | 0.129 |
| CVS time delay | 1.38 | 0.95 | 0.43 | 0.063 |
| CVI (dB) | 14.19 | 8.96 | 5.23 | 0.421 |
| CVI time delay | 1.02 | 1.06 | −0.05 | 0.274 |

Figure 7:
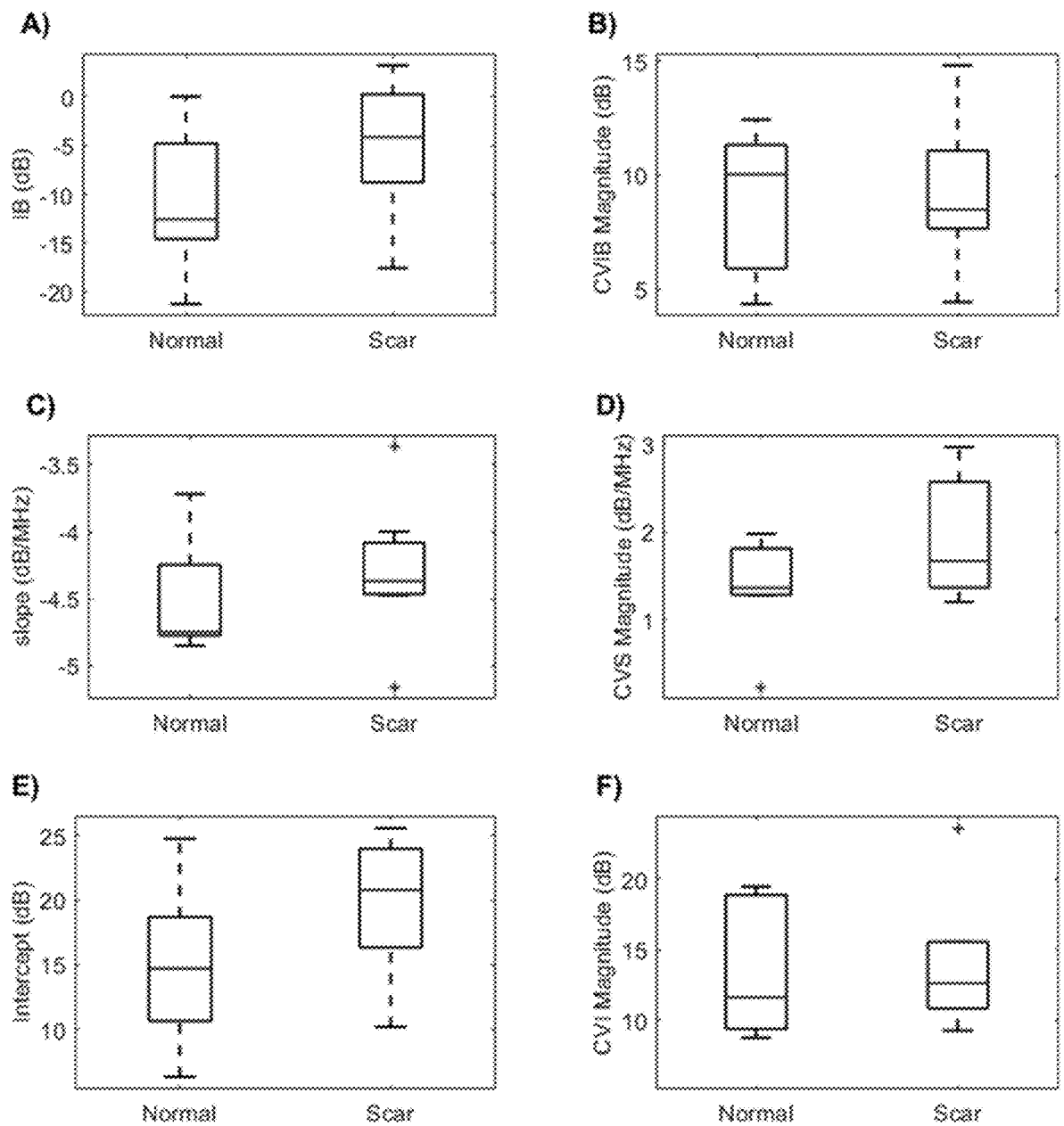
FIG. 7 illustrates differences in the distribution of six spectral parameters between unablated atrial myocardium of subjects with normal scar tissue.

As seen in FIG. 7 and Table 3, when comparing healthy to scarred myocardium (determined by voltage mapping), there were no significant differences noted in any spectral parameters gated for end-diastole (panels (A), (C), and (E)). Further, there were no statistically significant associations gating these parameters to other parts of the heart cycle. The parameter with the greatest relative separation between the healthy and scarred tissue states was IB (−10.1 vs −5.4 dB, p=0.09) (panel (E)), though this association did not reach statistical significance.

TABLE 3

| Parameter | Normal | Scar | Difference | P-value |
| --- | --- | --- | --- | --- |
| IB (dB) | −10.1 | −5.4 | −4.7 | 0.09 |
| Slope (dB/MHz) | −4.48 | −4.31 | −0.17 | 0.28 |
| Intercept (dB) | 14.7 | 18.8 | −4.1 | 0.14 |
| CVIB Magnitude (dB) | 8.8 | 9.2 | −0.4 | 0.42 |
| CVIB time delay | 0.97 | 0.98 | −0.01 | 0.20 |
| Phase-corrected CVIB (dB) | 3.9 | 5.6 | −1.7 | 0.33 |
| CVS (dB/MHz) | 1.36 | 1.92 | −0.56 | 0.20 |
| CVI (dB) | 13.8 | 14.2 | −0.4 | 0.37 |

Figure 8:
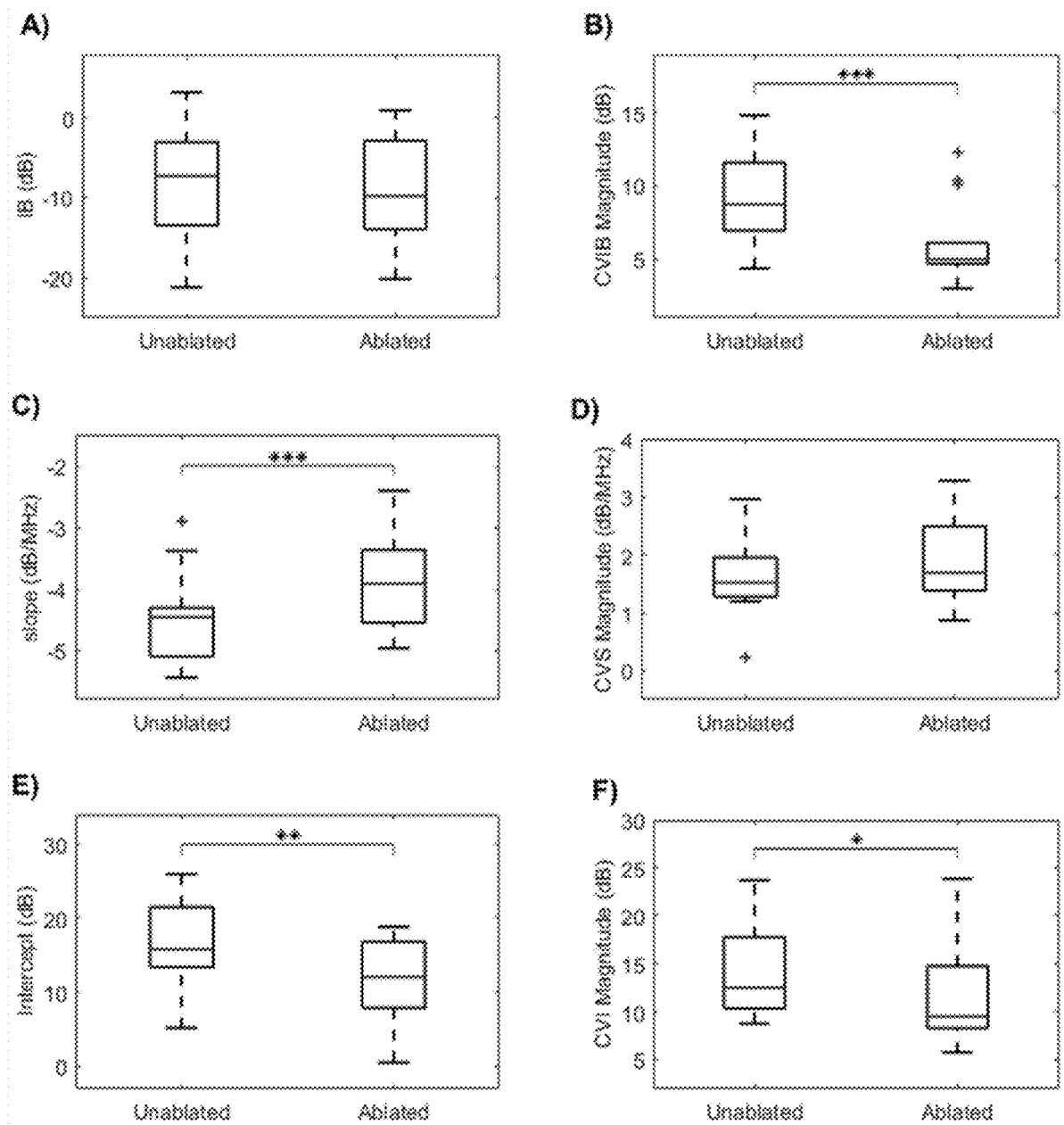
FIG. 8 illustrates differences in the distribution of six spectral parameters between unablated and ablated myocardium.
Figure 9:
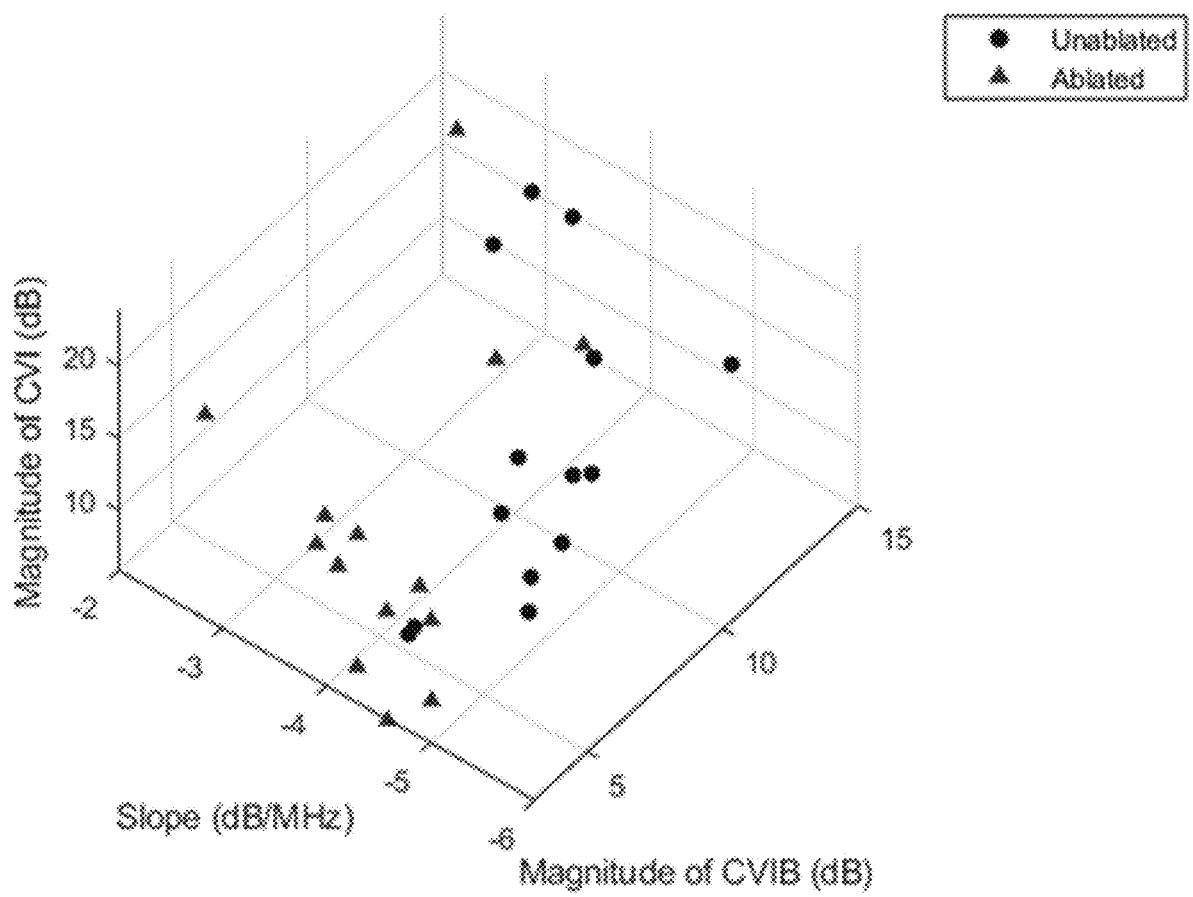
FIG. 9 is a 3-Dimensional plot of three statistically significant spectral parameters of unablated and ablated myocardium from 14 subjects, excluding the intercept parameter.

As seen in FIG. 8 and Table 4, when comparing unablated to ablated atrial myocardium from 14 subjects, there were several statistically significant associations noted. From parameters that were gated to end diastole, there was a significant increase in the slope (−4.39 vs −3.73 dB/MHz, p<0.001) (panel (C)) and decrease in the intercept (−16.8 vs −11.9 dB, p=0.002) (panel (E)). Further, gating these parameters to additional points of the cardiac cycle showed similar patterns of significance. From the cyclic variations of these parameters, there was a statistically significant decrease in the magnitude of the CVIB (9.0 vs 6.0 dB, p<0.001) (panel (B)), decrease in the phase-corrected magnitude of the CVIB (4.7 vs 1.1 dB, p=0.03), and decrease in the CVI (14.0 vs 11.5 dB, p=0.04) (panel (F)). When displayed graphically as in FIG. 9, the combination of slope, CVIB magnitude, and CVI magnitude show the best separation of the two groups.

TABLE 4

| Parameter | Unablated | Ablated | Difference | P-value |
|---|---|---|---|---|
| IB (dB) | −7.7 | −8.9 | 1.2 | 0.18 |
| Slope (dB/MHz) | −4.39 | −3.73 | −0.67 | <0.001 |
| Intercept (dB) | −16.8 | −11.9 | 4.9 | 0.002 |
| CVIB Magnitude (dB) | 9.0 | 6.0 | 3.0 | <0.001 |
| CVIB time delay | 1.0 | 1.0 | −0.1 | 0.79 |
| Phase-corrected CVIB (dB) | 4.7 | 1.1 | 3.6 | 0.03 |
| CVS (dB/MHz) | 1.64 | 1.91 | −0.27 | 0.16 |
| CVI (dB) | 14.0 | 11.5 | 2.5 | 0.04 |

Considering the above, compared to those with paroxysmal AF (which would be expected to have a lower degree of fibrosis), subjects with persistent AF had significant increases in IB and slope, with a corresponding decrease in intercept. The cyclic variation of these spectral parameters was not significantly different between the two groups. As this measure primarily reflects the myocardial viability or contractile reserve for the tissue, the difference in this parameter is minimal compared to differences in IB, which directly correlates to fibrosis.

Additionally, there were no statistically significant differences in any spectral parameters between atrial tissues that were grossly classified as having a high scar burden and those having a low scar burden, as measured by voltage mapping. This is because although ultrasound is dependent on the structural properties of the backscattering tissue (and thus sensitive to structural changes including the fibrotic changes of scar formation), it is not inherently tied to the electrical activity of the myocardium itself (even though the structure and function of the tissue are related). In other words, the spectral parameters are sensitive to the structural changes of fibrosis in the pathogenesis of AF, but are less sensitive to the electrical conductivity. Accordingly, evaluation of scar using ultrasound may provide an independent data point that is more reflective of fibrosis than electrical activity, which is currently monitored intra-operatively by voltage mapping.

Still further, there are statistically significant decreases in the slope, intercept, CVIB, and CVI between unablated and ablated myocardium. There was no difference between the IB of the two groups, which suggests that IB is more sensitive to the delayed effects of myocardial injury and ischemia (i.e., fibrosis) rather than the immediate effects of edema and inflammation. Among the parameters that differed between the two tissue types, CVIB was the most robust, demonstrating the highest degree of separation. This ability to differentiate atrial myocardium before and after ablation can help monitor the formation of RF lesions and predict their durability. Visualization of these data points shows a reasonable degree of separation between the two types of tissue. Furthermore, it is noted that the spectral intercept and slope vary cyclically with the heart cycle in a predictable manner, and the magnitude of the CVI is significantly lower in atrial myocardium following ablation. In view of this, different tissue types may be detected with a high degree of accuracy based on the slope, intercept, CVIB, and CVI.

Considering the above, the described parameters can distinguish paroxysmal from persistent AF, and differentiate degrees of ischemic myocardium for predicting whether myocardial regions will recover from ischemic injury, due to differing degrees of scar and fibrosis represented by the differences in spectral parameter values. Accordingly, these spectral parameters can be analyzed to assess atrial myocardial viability in the context of ablations atrial fibrillation. Similarly, the spectral parameters can differentiate unablated from recently ablated myocardium, and be used to determine if tissue that has lost the ability to conduct electrical signals is fully ablated rather than merely stunned (and will recover). In short, the spectral parameter values can be analyzed pre- and intra-operatively for procedure planning and monitoring lesion formation during ablations.

In other words, the above-described spectral parameters are correlated to tissue states. Therefore, evaluation of the spectral parameters can be used to determine particular areas of a heart or other tissue may be healthy, scarred/injured, and/or candidates for ablation. Evaluation of the spectral parameters can thus also be used to determine whether a lesion from an ablation procedure has properly affected the tissue (e.g., substantially damaged the tissue to disrupt electrical conductive in the desired manner), and therefore, whether further ablation should be performed at that location. In view of this, the method exemplified in FIG. 1 may be performed on a patient prior to an ablative procedure to identify potential ablation locations and/or to evaluate the feasibility of an ablative procedure, and/or may be performed during an ablative procedure to evaluate and/or guide the progress of the procedure.

Figure 10:
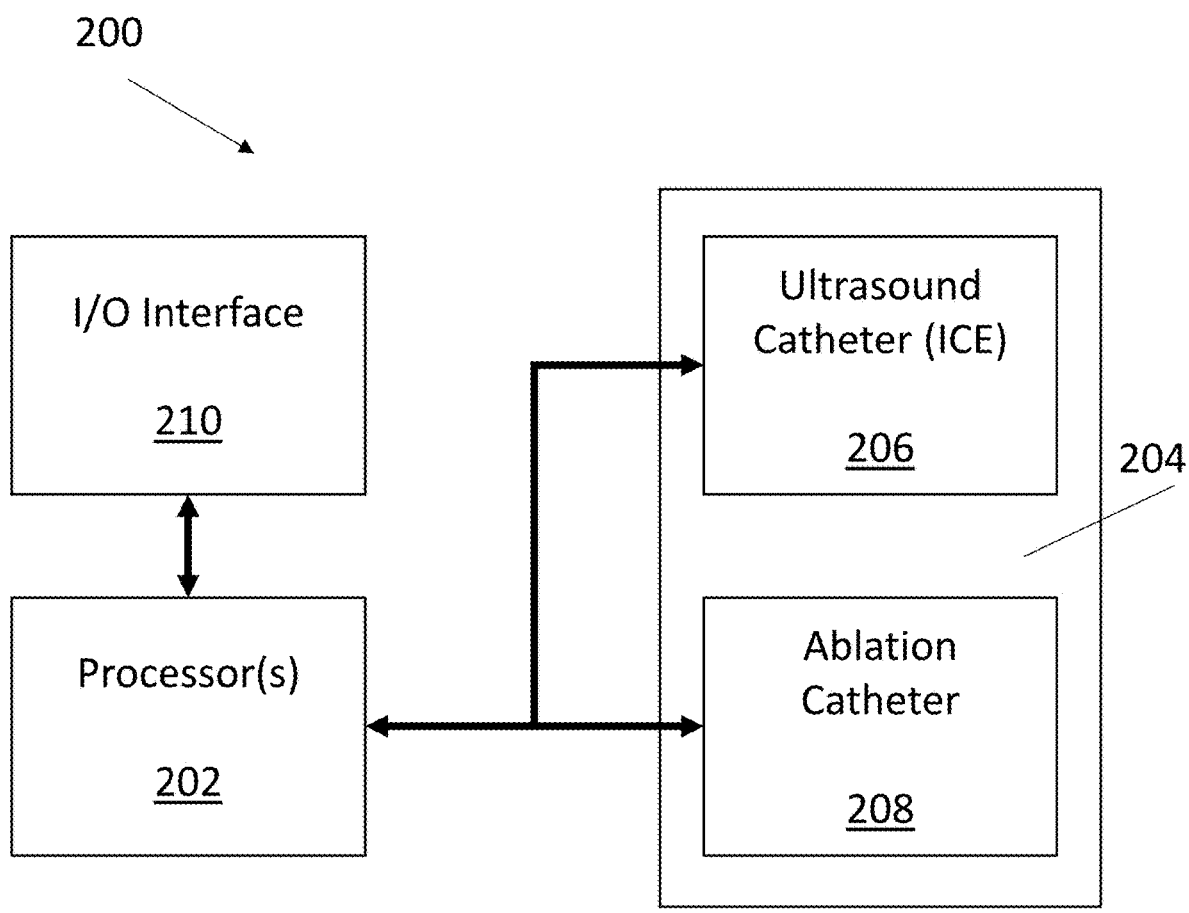
FIG. 10 schematically illustrates an example system for implementing the method described herein.

The above method may be implemented on a system such as that illustrated in FIG. 10. The example ablation system 200 therein includes at least one processor 202, a catheter bundle 204, and an input/output interface 210. The catheter bundle includes at least an ultrasound catheter 206 (e.g., an ICE catheter) for transmitting an incident ultrasound signal and detecting the backscatter, and an ablation catheter 208 for performing an ablation procedure. While the ultrasound catheter 206 and ablation catheter 208 are shown together as part of a common catheter bundle 204, these catheters 206, 208 are not necessarily integrated and may instead be distinct catheters. Further, where the system 200 is only used for diagnostic purposes (e.g., preoperative determination of ablation locations), an ablation catheter 208 is not necessarily included. As described above, the detected backscatter from the ultrasound catheter may be transduced to an electrical signal and transmitted to the at least one processor 202.

The at least one processor 202 is programmed to perform the analysis illustrated in FIG. 1. For example, the at least one processor is configured to process the backscatter signal by converting it to the spectral domain 102, isolating and normalizing the backscatter transfer function component 104, obtain spectral parameters 106, and analyzed the spectral parameters 108. Based on the determined parameters and/or analysis results, the at least one processor 202 is further configured to control the input/output interface 210 to output the determined parameters and/or analysis results thereto. The input/output interface 210 may include a display, printer, speaker, or the like, for providing the output to the user. Additionally, the input/output interface 210 may include input devices such as a touchscreen, mouse, keyboard, and the like for a user to interact with the system 200. For example, the input/output interface 210 may be used to control operation of the ultrasound catheter 206 and/or the ablation catheter 208. In some embodiments, a user may also utilize the input/output interface 210 to navigate historical records of a patient. For example, prior determined spectral parameters, analysis results, and ablation procedure information may be stored locally or remotely (e.g., in memory, such as a hard disk or flash memory, or in the 'cloud'). Such stored information may be retrievable by a user and displayed on the input/output interface.

In some embodiments, the at least one processor 202 may be integrated with an existing ablation or ultrasound system. For example, the processors of those systems may be programmed to perform the method of FIG. 1, such that the method does not require a distinct system to be executed. In some embodiments, the at least one processor 202 may be a trained machine learning system (e.g., a single tree, random forest, and/or support vector machine). In these embodiments, the machine learning system is trained to determine parameter values and/or recommended ablation procedure actions based on an input of spectral parameters or the backscatter signal.

While various features are presented above, it should be understood that the features may be used singly or in any combination thereof. Further, it should be understood that variations and modifications may occur to those skilled in the art to which the claimed examples pertain.

What is claimed is:

1. A method of treatment, comprising:
   ultrasonically insonifying a portion of myocardial tissue in a patient;
   measuring a backscatter signal of ultrasonic waves backscattered from the portion of myocardial tissue;
   determining a spectral parameter of the backscatter signal, including isolating a portion of the backscatter signal caused by tissue backscatter;
   correlating a value of the spectral parameter with an electrical conductivity of the portion of myocardial tissue; and
   adjusting a treatment of the patient based on the correlation.

2. The method of claim 1, further comprising, prior to insonifying the portion of myocardial tissue:
   ablating the portion of myocardial tissue, thereby disrupting the electrical conductivity of the portion of myocardial tissue,
   wherein adjusting the treatment of the patient comprises re-ablating the portion of myocardial tissue or ablating a second portion of myocardial tissue, a location of the ablated portion of myocardial tissue being different than a location of the second portion of myocardial tissue.

3. The method of claim 1, wherein said spectral parameter is a cyclic variation of integrated backscatter, of an effective backscatter transfer function.

4. The method of claim 1, wherein said spectral parameter is a cyclic variation of intercept, of a fit of an effective backscatter transfer function.

5. The method of claim 1, wherein said spectral parameter is a cyclic variation of slope, of a fit of an effective backscatter transfer function.

6. The method of claim 1, further comprising:
   inputting the spectral parameter to a machine learning system, the machine learning system being trained to output a state of the portion of myocardial tissue, the electrical conductivity of the portion of myocardial tissue, or a treatment of the patient, based on the input spectral parameter; and
   adjusting the treatment of the patient based on the output from the machine learning system.

7. The method of claim 6, wherein the machine learning system comprises a single-tree, random-forest, or support vector machine.

8. The method of claim 1, wherein adjusting the treatment of the patient comprises:
   re-ablating the portion of myocardial tissue until the spectral parameter is minimized.

9. The method of claim 1, comprising:
   determining a plurality of spectral parameters;
   correlating values of the plurality of spectral parameter with an electrical conductivity of the portion of myocardial tissue; and
   adjusting a treatment of the patient based on the correlations.

10. The method of claim 9, wherein the plurality of spectral parameters comprise two or more parameters selected from the group consisting of: integrated backscatter, cyclic variation of integrated backscatter, slope, cyclic variation of slope, intercept, and cyclic variation of intercept, the parameters being of an effective backscatter transfer function or a fit of the effective backscatter transfer function.

11. The method of claim 1, wherein isolating the portion of the backscatter signal caused by tissue backscatter includes normalizing a power spectrum of the backscatter signal to a reference phantom.

12. A method of treating atrial fibrillation, comprising:
   ultrasonically insonifying a plurality of portions of myocardial tissue in a patient, each of the plurality of portions of myocardial tissue being at a different location of the myocardial tissue;
   for each of the plurality of portions of myocardial tissue;
      measuring a backscatter signal of ultrasonic waves backscattered from the corresponding portion of myocardial tissue;
      determining a cyclic spectral parameter of the corresponding backscatter signal; and
      correlating a value of the spectral parameter with an electrical conductivity of the corresponding portion of myocardial tissue;
   determining an ablation location based on the correlations, the ablation location being one of the plurality of portions of myocardial tissue; and
   ablating the myocardial tissue at the ablation location.

13. The method of claim 12, further comprising, after ablating the myocardial tissue: ultrasonically insonifying the ablation location;
   measuring a backscatter signal of ultrasonic waves backscattered from the ablation location;
   determining a post-ablation spectral parameter of the backscatter signal;
   correlating a value of the post-ablation spectral parameter with an electrical conductivity of the ablation location; and
   re-ablating the ablation location or ablating a different portion of myocardial tissue.

14. The method of claim 12, wherein said cyclic spectral parameter is a cyclic variation of integrated backscatter, of an effective backscatter transfer function.

15. The method of claim 14, wherein ablating the myocardial tissue is continued until a magnitude of cyclic variation of the integrated backscatter is less than a predetermined threshold.

16. The method of claim 12, wherein said cyclic spectral parameter is a cyclic variation of intercept, of a fit of an effective backscatter transfer function.

17. The method of claim 12, wherein said cyclic spectral parameter is a cyclic variation of slope, of a fit of an effective backscatter transfer function.

18. The method of claim 12, further comprising:
for each of the plurality of portions of myocardial tissue, inputting the cyclic spectral parameter to a machine learning system, the machine learning system being trained to output a state of the corresponding portion of myocardial tissue, the electrical conductivity of the corresponding portion of myocardial tissue, or a determination of whether to ablate the corresponding portion of myocardial tissue.

19. The method of claim 18, wherein the machine learning system comprises a single-tree, random-forest, or support vector machine.

20. The method of claim 12, wherein determining the cyclic spectral parameter includes determining a change in magnitude or phase at two points in time in a cardiac cycle.

\* \* \* \* \*